Nov. 3, 1936.                H. A. LEONHAUSER                2,059,590
                          CAR WHEEL GRINDING DEVICE
                    Filed April 5, 1934        2 Sheets-Sheet 1
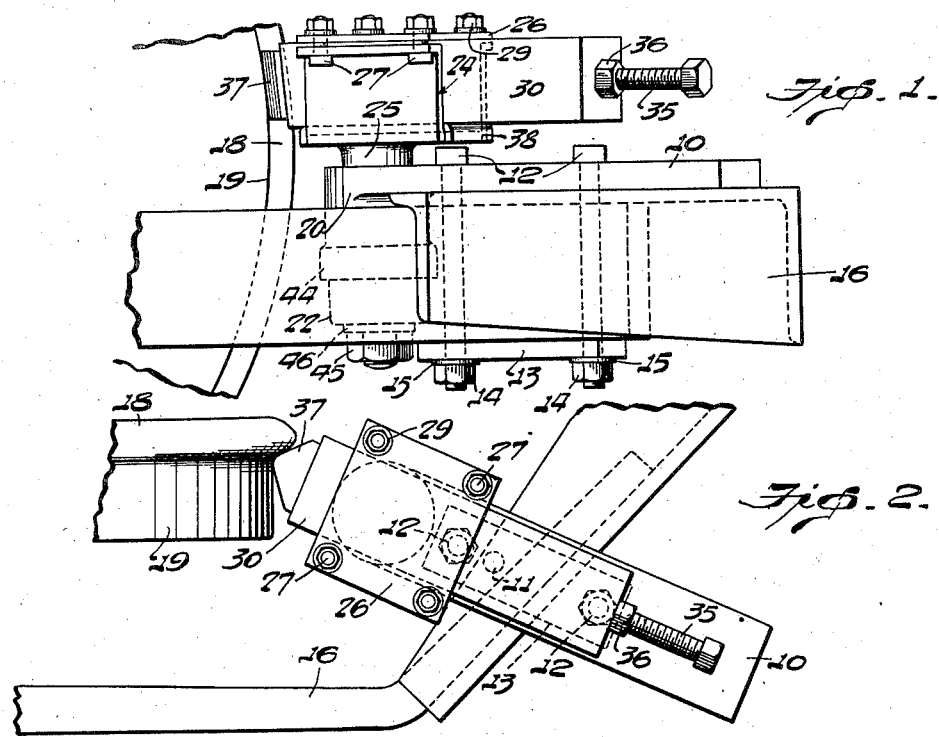
Fig. 1.
Fig. 2.
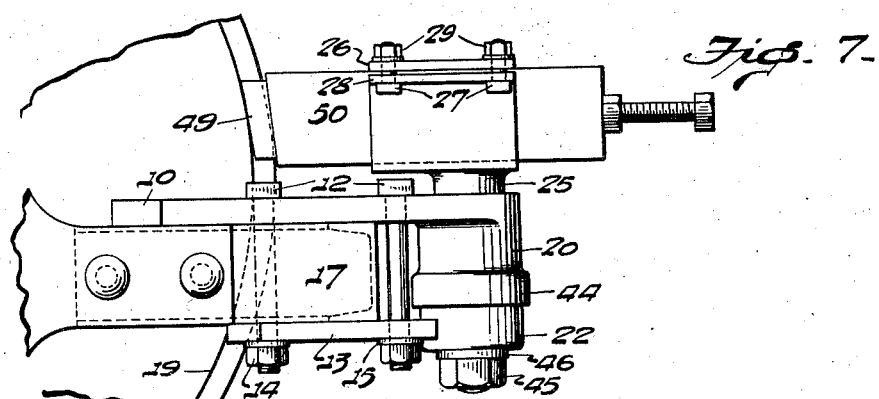
Fig. 7.
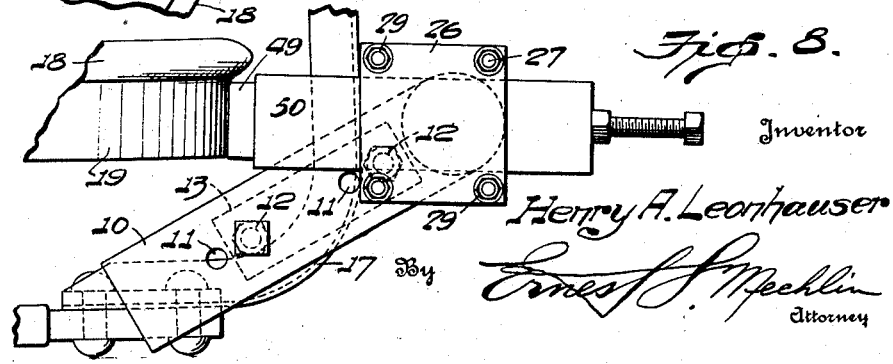
Fig. 8.
Inventor
Henry A. Leonhauser
By Ernest S. Mechlin
Attorney Nov. 3, 1936.  H. A. LEONHAUSER  2,059,590
CAR WHEEL GRINDING DEVICE
Filed April 5, 1934   2 Sheets-Sheet 2
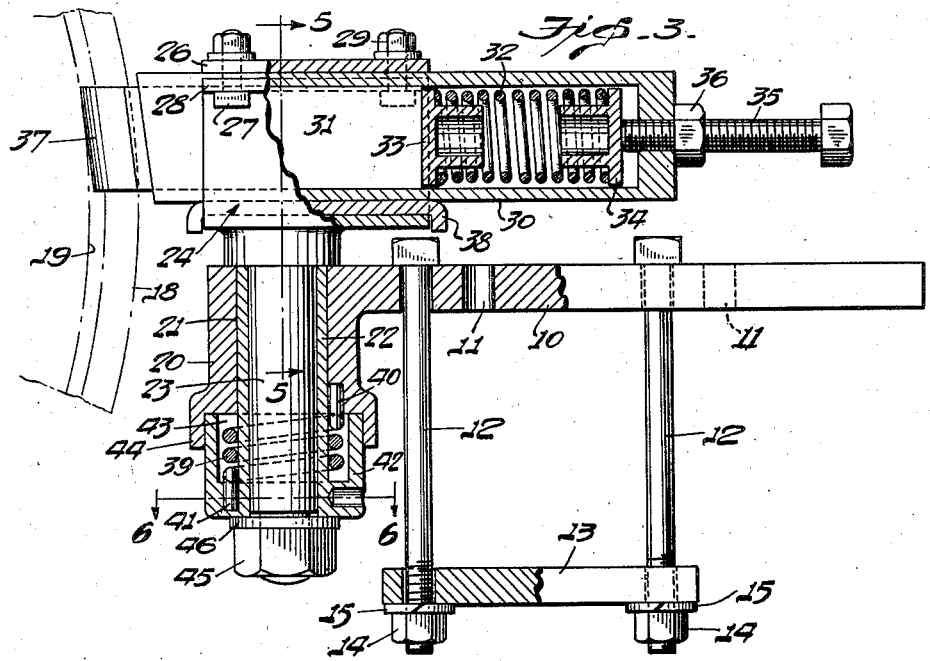
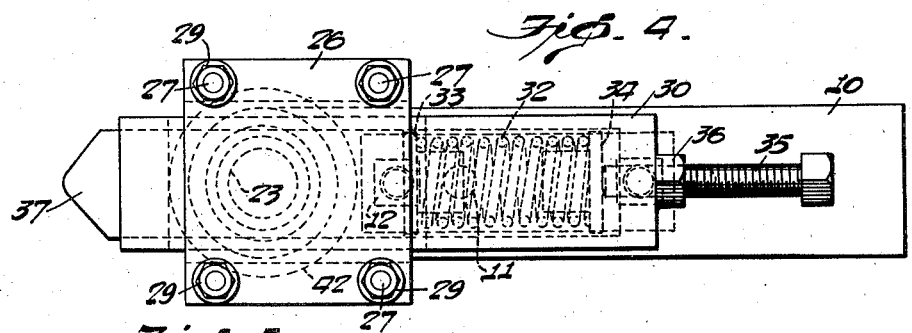
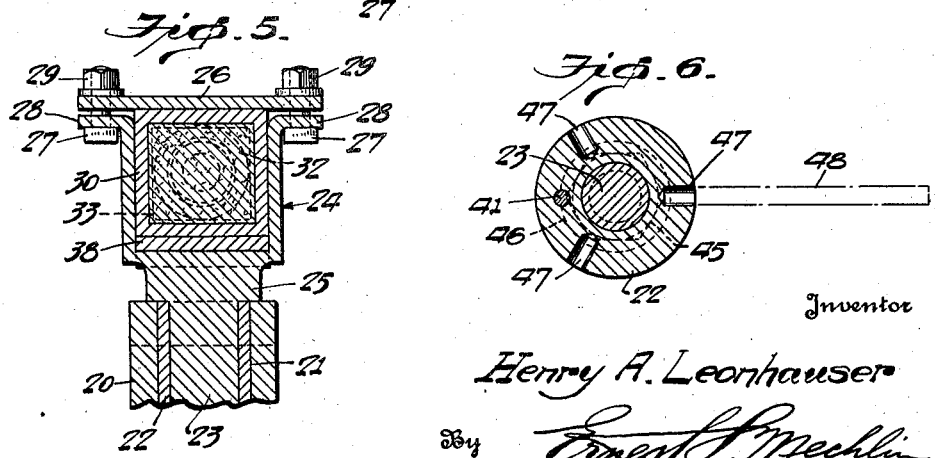
Inventor
Henry A. Leonhauser
By Ernest P. Mechlin
Attorney Patented Nov. 3, 1936

2,059,590

UNITED STATES PATENT OFFICE 2,059,590

CAR WHEEL GRINDING DEVICE

Henry A. Leonhauser, Baltimore, Md., assignor to The Carborundum Company, Niagara Falls, N. Y., a corporation of Pennsylvania Application April 5, 1934, Serial No. 719,198

18 Claims. (Cl. 51—255)

The invention relates to devices for grinding, honing or truing up the wheels of urban, interurban and other car wheels, and has for its general object the provision of a novel device by means of which car wheels may be dressed while the cars are in service.

It is well known that the flanges of car wheels, particularly those used on tracks of the type common in city streets become badly and irregularly worn and it is likewise well known that the wheel treads frequently develop flat spots for instance as the result of the sudden application of brakes and the sliding of the car wheels when emergency stops are necessary. Ordinarily it is necessary to remove the car wheels from beneath the car and place them in a wheel lathe for the purpose of turning them down, an operation which entails considerable labor and time and which is therefore expensive when viewed from many angles.

It is with the above facts in view that I have devised the present invention which contemplates the provision of an attachment to a car truck of any ordinary or well known variety, the attachment operating to grind, true and dress the wheel flanges and/or the treads while the car is in operation or service, thereby avoiding any necessity for laying it up for repairs and thereby eliminating loss of service, labor, etc.

An important object of the invention is to provide a device which is particularly designed for dressing the well known thick or heavy duty wheel flanges entirely automatically, the mechanism involving means for maintaining a dressing or grinding action on the flanges or treads at all times.

Another important object of the invention is to provide a car wheel grinder embodying an abrasive element or member in the nature of a carborundum block or the like which is urged by spring means into constant engagement with the wheel flanges or treads, this spring means being of such character that it will cause the carborundum block or other abrasive element to conform to the position of the car wheels regardless of whether they be traveling along straight track or whether they are deflected from their usual position as for example when rounding turns or passing over switches from one track to another or the like.

Another object of the invention is to provide means adapted to be attached to a car truck for holding a block of appropriate abrasive material, such as carborundum or the like which is spring pressed lengthwise into engagement with the wheel flange or tread, as the case may be, and which is equipped with torsion means for insuring lateral contact of the abrasive member or element with the face of the wheel flange, in case it is the flange that is to be dressed.

Still another object is to provide an attachment of this character comprising a holder within which may be engaged a selected size and shape of abrasive member, depending upon whether it is the wheel flange or the wheel tread which is to be dressed or trued, it being within the purview of the invention to provide shims to compensate for differences in the cross sectional dimensions of the abrasive or grinding element used so that a variety may be employed interchangeably by the simple expedient of adding or removing shims.

A further object is to provide a device of this character which may be manufactured and sold as a complete and separate entity adapted for attachment to different varieties of already existing car trucks without involving any changes whatsoever in the construction thereof, the device being purely auxiliary or adjunctive and capable of attachment whenever and wherever its use is desirable.

Yet anoher object is to provide a wheel dressing means of this type embodying torsion spring means for maintaining close engagement of the abrasive tool or member with the wheel flange, the devices or at least the springs being necessarily made in rights and lefts for working upon the wheels at the opposite sides of a truck, it being moreover a feature to provide means for adjusting the torsional tendencies of the spring.

An additional object is to provide a mechanism of this character which will be simple and inexpensive to make, easy to install, positive and automatic in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of a fragment of the frame of a car truck and a car wheel showing my device applied thereto, the particular embodiment being means for grinding or dressing the wheel flanges, Figure 2 is a top plan view of what is shown in Figure 1, Figure 3 is a view mostly in vertical longitudinal section but somewhat in side elevation, showing the details of construction of the mechanism, Figure 4 is a plan view of what is shown in Figure 3, Figure 5 is a vertical detail section taken on the line 5—5 of Figure 3, Figure 6 is a detail cross sectional view taken on the line 6—6 of Figure 3, Figure 7 is a view similar to Figure 1 but showing the device mounted on a truck frame of somewhat different construction and embodying an abrasive member for dressing the wheel tread, Figure 8 is a plan view of what is shown in Figure 7.

Referring more particularly to the drawings I have shown the device as comprising an attaching bracket 10 provided with a plurality of holes 11, for adjusting purposes, through which extend bolts 12 which also pass through a clamping plate 13 and which are equipped with nuts 14 and spring washers 15, the bracket 10 and the plate 13 being disposable on the top and bottom of some convenient portion of a truck frame 16 of the type illustrated in Figures 1 and 2 or a frame 17 of the type illustrated in Figures 7 and 8. As a matter of fact it makes no particular difference what the style or design of truck frame may be as the bracket, clamping plate and securing bolts will enable the device to be mounted on any of the conventional types of frames or trucks. The purpose of the holes 11 is to enable the device to be adjusted properly with respect to the flange 18 or tread 19 of the wheel to be dressed, ground or honed.

At one end the bracket 10 is formed with a depending cylindrical bearing portion 20 having a bore 21 therethrough within which is rotatable a sleeve 22 surrounding and rotatable with a spindle or trunnion 23 which depends from a sectional housing indicated as a whole by the numeral 24, there being an enlarged portion 25 above the spindle 23 bearing upon the top of the bracket 10 and extending outwardly beyond the joint between the sleeve 22 and the bearing portion 20 for the purpose of excluding dirt, water and the like. The housing 24 is represented as of trough-like shape open at the top and having its open top normally closed by a plate 26 secured in place as by bolts 27 passing through the plate and through outstanding flanges 28 at the side edges of the housing 24, these bolts being of course equipped with nuts 29.

Clamped within the housing 24 by means of the plate 26 and bolts 27 is a box-like casing 30, represented as of rectangular shape, containing a block 31 of carborundum or other appropriate abrasive material, one end of which block projects beyond the casing 30 and is urged into such projected position by means of a spring 32 engaging against a pair of followers 33 and 34, the former of which is in contact with the block and the latter of which is engaged by a screw 35 carrying a lock nut 36, the purpose of the screw 35 being to adjust the spring pressure exerted against the block 31 by the spring 32, it being manifest that as the active end of the block wears away the spring tension should be increased to hold the block in proper operative relation to the wheel. In the form of the invention shown in Figures 1 to 5 the active end 37 of the abrasive block is represented as of V-shape inasmuch as it is intended to grind the wheel flange 18.

As it is intended that the housing 24 be capable of containing abrasive blocks 31 of different sizes, and therefore necessarily different sizes of casings 30 for containing the blocks, it is a feature to make use of end flanged shims 38 which are disposable within the housing 24 and between the same and the casing 30, as clearly illustrated in Figures 1, 3, and 5, it being obvious that by using fewer or more of the shims grinding blocks of widely different sizes may be accommodated or properly mounted within the housing. In some respects this may be considered a mere detail but the feature has importance as will be pointed out hereinafter.

The above described spring 32 of course operates to project the grinding block into engagement with the wheel flange and in order to insure proper contact, which will be firm yet yieldable, between the grinding block and the wheel flange 18, I make use of a torsion spring 39 here represented as surrounding the sleeve 22 and having one end 40 engaged within a hole in the lower face of the depending bearing portion 20 and which has its other end 41 engaged within a hole in the bottom portion of the sleeve 22, the sleeve having an upstanding flange 42 spaced outwardly from its body portion to define a space or chamber 43 accommodating the spring 39, this flange 42 being rotatably received within the confines of a depending flange 44 on the bearing portion 20, the purpose being to protect the joint against the ingress of water, dirt or other foreign material which might have a deleterious effect. The parts are held assembled by means of a nut 45 screwed onto the threaded lower end of the spindle 23, which lower end projects beyond the bottom of the sleeve 22, it being preferable to interpose a washer 46 between the nut and the bottom of the sleeve 22. When the nut 45 is turned tightly it will jam the sleeve 22 between the washer 46 and the enlargement 25 at the top of the bracket 10 and as a consequence the sleeve 22 will be held tightly so that it will rotate with the spindle 23 under the torsional influence of the spring 39.

There must be one of the grinding devices for each of the truck wheels and as a consequence the torsion spring 39 for a grinding device at one side of the truck would have to be reversed with respect to the spring for a grinding device at the opposite side of the truck, or in other words the torsion springs 39 used at opposite sides of the truck must be made "right" and "left" inasmuch as the arrangement must be such as to urge the grinding block inwardly toward the center of the truck or track in order to maintain active contact between the end 37 and the flange 18 to be ground.

It is frequently of importance to be able to adjust the tension of the torsion spring 39 which urges the grinding block into engagement with the wheel flange and in order to accomplish this I have provided the lower end of the flange 42 with a plurality of radially extending sockets or recesses 47 within any one of which may be engaged a rod-like tool indicated by dot and dash lines 48 in Figure 6 for the purpose of rotating the sleeve 22, when the nut 45 is loosened, and thereby varying the torsional strain exerted by the spring 39. Of course after such adjustment the nut 45 must be tightened to hold the sleeve 22 immovable with respect to the spindle 23 so that it will turn therewith under the influence of the spring.

In the use of the device for grinding wheel flanges, it is apparent that the spring 32 will operate to protrude the grinding block 31 so that the V-shaped end 37 thereof will come into engagement with the wheel flange as clearly shown in Figures 1, 2, 3, and 4. At the same time the torsion spring 39 will operate to urge the grinding block against the inner edge of the flange so that as the car travels along the wheel flange will be properly ground, dressed or honed and be thereby maintained in proper condition, high sections being removed and the flange consequently trued up.

In some instances it may be desirable to grind the wheel treads, for instance for the purpose of removing flat spots which may result from any cause, and in case such is desired my device will operate with equal efficiency, it being merely necessary to replace the V-pointed or ended grinding block 31 with a differently shaped block 49, shown in Figures 7 and 8, which has a differently shaped active face enabling it to bear against the wheel tread throughout the width thereof. In such an instance, the casing 50 containing or enclosing the block and corresponding to the casing 30 for the block 31 will probably be of greater dimensions than the casing 30, in which event the above described shim or shims 38 would simply be removed, thereby enabling the larger sized block casing to be clamped within the housing 24.

The operation of the device for dressing off wheel treads is the same as when dressing the flanges, the only difference being in the selection of a grinding block of appropriate shape depending upon which operation is desired. It is also conceivable that two of the devices may be arranged one above the other so that while one is dressing the wheel flange the other will grind or hone the tread. By providing the torsion springs in right and left hand form it is clear that the grinding blocks will be maintained in proper engagement with the wheel to be dressed. Moreover the compression spring 32 reacting against the adjustable follower and the inner end of the grinding block will serve to slide the latter outwardly with respect to its casing so that it will be maintained in firm but yieldable engagement with the wheel so that its function will be efficiently carried out.

It will be noted that the depending spindle or trunnion 23 is located eccentrically with regard to the housing 24. When new wheels are being dressed it is intended that the short end of the housing be disposed toward the wheel and that after wheels have become old and dressed down the housing may be turned around so that the long end thereof will be faced toward the wheel. Another point to be considered is that the casing 30 which contains the grinding block may be adjusted to extend to a greater or less extent beyond the housing 24 in accordance with the extent to which the wheel has been ground down, it being manifest that as the wheel is ground away it will be necessary to shift or adjust the grinding device.

It is thought from the above that the construction, operation and advantages will be readily apparent to one skilled in the art without further explanation though it might be mentioned that the device will effect a great saving in time and labor involved in the usual method of removing the wheels from the car and truing them in appropriate lathes. As a result of the employment of my device it should be apparent that there will be no laying up of a car for wheel dressing purposes and consequently no interruption to service.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Means for dressing the wheels of a car truck while the truck is in service, comprising a supporting bracket equipped with means for clamping the same upon a truck frame, means rotatably mounted upon said bracket and carrying an abrasive element, spring means engaging said abrasive element for protruding the same into engagement with a wheel, and torsion spring means urging the abrasive element toward the inner side of the wheel.

2. Means for dressing a wheel of a car truck while the car is in service, comprising a supporting bracket adapted to be clamped upon a truck frame, a holder pivotally mounted on said bracket, an abrasive element slidably mounted in said holder, spring means for urging the abrasive element into contact with an adjacent wheel, and torsion spring means cooperating with the bracket and the holder for urging the abrasive element toward the wheel flange.

3. Means for dressing a wheel of a car truck while the car is in service, comprising a supporting bracket adapted to be clamped upon a truck frame, said bracket having a bearing portion, a holder mounted above the bracket and having a trunnion portion rotatably engaged within said bearing portion, an abrasive element slidably mounted within said holder, spring means within the holder engaging said abrasive element for projecting the same toward an adjacent car wheel, and spring means reacting against said bearing portion and the holder for urging the abrasive element toward the wheel flange.

4. Means for dressing a wheel of a car truck while the car is in service in car house, shop or yard, comprising a supporting bracket adapted to be clamped upon a truck frame, said bracket having a bearing portion, a holder mounted above the bracket and having a trunnion portion rotatably engaged within said bearing portion, an abrasive element slidably mounted within said holder, spring means within the holder engaging said abrasive element for projecting the same toward an adjacent car wheel, and spring means reacting against said bearing portion and the holder for urging the abrasive element toward the wheel flange, said last named spring means consisting of a torsion spring surrounding the trunnion portion and having one end anchored to the bearing portion and its other end anchored with respect to the trunnion portion.

5. Means for dressing a wheel of a car truck while the car is in service in car house, shop or yard, comprising a supporting bracket adapted to be clamped upon a truck frame, said bracket having a bearing portion, a holder mounted above the bracket and having a trunnion portion rotatably engaged within said bearing portion, an abrasive element slidably mounted within said holder, spring means within the holder engaging said abrasive element for projecting the same toward an adjacent car wheel, spring means reacting against said bearing portion and the holder for urging the abrasive element toward the wheel flange, said last named spring means consisting of a torsion spring surrounding the trunnion portion and having one end anchored to the bearing portion and its other end anchored with respect to the trunnion portion, and means for varying the tension of said torsion spring.

6. Means for dressing a wheel of a car truck while the car is in service, comprising a supporting bracket, means for clamping the bracket upon a truck frame, said bracket having a bearing portion, a housing mounted upon the bracket and having a depending trunnion portion rotatable within said bearing portion, a casing clamped within said housing, an outwardly spring-pressed abrasive element slidably mounted within said casing and projected toward an adjacent wheel, and torsion spring means reacting against said bearing portion and said trunnion portion for urging the casing and consequently the abrasive element toward the wheel flange.

7. Means for dressing a wheel of a car truck while the car is in service in car house, shop or yard, comprising a supporting bracket disposable upon the truck frame, clamping means cooperating with said bracket to secure the same in adjusted position upon the truck frame, said bracket having a bearing portion, a housing carried by the bracket and having a trunnion portion rotatable with respect to said bearing portion, a sleeve surrounding said trunnion portion and held stationary with respect thereto, an abrasive block, a casing containing said block clamped within said housing, spring means within said casing for projecting said block toward an adjacent car wheel, and a torsion spring having one end anchored with respect to the bearing portion and its other end anchored with respect to said sleeve for exerting rotative force upon said housing for urging said block toward the wheel flange.

8. Means for dressing a wheel of a car truck while the car is in service, comprising a supporting bracket disposable upon the truck frame, clamping means cooperating with said bracket to secure the same in adjusted position upon the truck frame, said bracket having a bearing portion, a housing carried by the bracket and having a trunnion portion rotatable with respect to said bearing portion, a sleeve surrounding said trunnion portion and held stationary with respect thereto, an abrasive block, a casing containing said block clamped within said housing, spring means within said casing for projecting said block toward an adjacent car wheel, and a torsion spring having one end anchored with respect to the bearing portion and its other end anchored with respect to said sleeve for exerting rotative force upon said housing for urging said block toward the wheel flange, said sleeve having an outwardly and upwardly extended flange at its lower end defining a compartment containing said torsion spring.

9. Means for dressing a wheel of a car truck while the car is in service in car house, shop or yard, comprising a supporting bracket disposable upon the truck frame, clamping means cooperating with said bracket to secure the same in adjusted position upon the truck frame, said bracket having a bearing portion, a housing carried by the bracket and having a trunnion portion rotatable with respect to said bearing portion, a sleeve surrounding said trunnion portion and held stationary with respect thereto, an abrasive block, a casing containing said block clamped within said housing, spring means within said casing for projecting said block toward an adjacent car wheel, a torsion spring having one end anchored with respect to the bearing portion and its other end anchored with respect to said sleeve for exerting rotative force upon said housing for urging said block toward the wheel flange, said sleeve having an outwardly and upwardly extended flange at its lower end defining a compartment containing said torsion spring, and said bearing portion having an outwardly extended flange telescoping exteriorly upon said first named flange for protecting the joint.

10. Means for dressing the wheels of a car truck, comprising a supporting structure, means for mounting said supporting structure upon a truck frame, means rotatably mounted upon said supporting structure and carrying an abrasive element, spring means for urging said abrasive element toward the tread of the wheel, and other spring means carried by said supporting structure for urging said rotatable means about its axis of rotation whereby the portion of the abrasive element adjacent the wheel is urged toward the wheel flange.

11. Means for dressing the tread and flange of the wheels of a car truck, comprising a support, means for mounting said support upon a truck frame, abrasive-carrying means rotatably mounted on said support, an abrasive element movably carried by said last named means, spring means for protruding said abrasive element toward the periphery of the car wheel, and separate spring means enclosed with respect to said support cooperating with said third named means for urging the said rotatable means about its axis of rotation whereby the portion of the abrasive element adjacent the wheel is urged into engagement with the face of the wheel flange.

12. Means for dressing the tread and flange of the wheels of a car truck, comprising a support, means for mounting said support upon a truck frame, abrasive carrying means rotatably mounted on said support, an abrasive element movably carried by said last named means, spring means for protruding said abrasive element toward the periphery of the car wheel, separate spring means mounted within said support cooperating with said third named means for urging the said rotatable means about its axis of rotation whereby the portion of the abrasive element adjacent the wheel is urged into engagement with the face of the wheel flange, and means for adjusting each of said spring means independently.

13. Means for dressing the tread and flange of the wheels of a car truck while the truck is in service, comprising a support adapted to be mounted upon a truck frame, means rotatably mounted upon said support and carrying an abrasive element, resilient means engaging said abrasive element for protruding it into engagement with a wheel tread, and separate resilient means enclosed with respect to said support for urging the said rotatable means about its axis of rotation whereby the portion of the abrasive element adjacent the wheel is urged toward the face of the wheel flange.

14. Means for dressing the wheels of a car truck while the truck is in service, comprising a support adapted to be clamped upon a truck frame, a holder for an abrasive element rotatably mounted upon said support, resilient means located within said holder for urging the abrasive element toward the wheel tread, and torsion resilient means reacting with said holder for urging it about its axis of rotation whereby the portion of the abrasive element adjacent the wheel is urged toward the face of the wheel flange.

15. Means for dressing the wheels of a car truck while the truck is in service, comprising a support adapted to be clamped upon a truck frame, a holder for an abrasive element movably mounted upon said support, resilient means located within said holder for urging the abrasive element toward the wheel tread, torsion resilient means reacting with said holder for urging the abrasive element toward the face of the wheel flange, and means operable from the exterior of said holder for adjusting the pressure exerted by said first named resilient means.

16. Means for dressing the wheels of a car truck while the wheels thereof are rotated, comprising a support and means for mounting the same upon a truck frame, a holder movably mounted on said support and carrying an abrasive element, spring means for urging the abrasive element toward the wheel tread, and separate spring means enclosed with respect to the support and cooperating with the holder for urging the abrasive element toward the face of the wheel flange.

17. Means for dressing the wheels of a car truck while the wheels thereof are rotated, comprising a support and means for mounting the same upon a truck frame, a holder movably mounted on said support and carrying an abrasive element, spring means for urging the abrasive element toward the wheel tread, separate spring means enclosed with respect to the support and cooperating with the holder for urging the abrasive element toward the face of the wheel flange, and means operable from the exterior of the support for varying the tension exerted by said second named spring means.

18. A device for dressing the wheels of a car truck while the truck is in service, comprising a supporting bracket equipped with means for mounting said bracket upon a truck frame, means rotatably mounted upon said bracket and carrying an abrasive element, resilient means engaging said abrasive element for moving same into engagement with a wheel, and separate resilient means carried by said bracket and cooperating with said rotatable means for urging said abrasive element to one side of the wheel.

HENRY A. LEONHAUSER.